INVENTOR.
RAY F. DENT
BY
PATENT AGENT

TRIGGERED MARKER GENERATOR WITH FEEDBACK NETWORK
FOR HOLDING OFF UNDESIRED SIGNALS

Filed June 28, 1965 2 Sheets-Sheet 2

*INVENTOR.*
RAY F. DENT
*BY* [signature]
PATENT AGENT 3,353,035

TRIGGERED MARKER GENERATOR WITH FEEDBACK NETWORK FOR HOLDING OFF UNDESIRED SIGNALS

Ray F. Dent, Kitchener, Ontario, Canada, assignor to Dominion Electrohome Industries Limited, Kitchener, Ontario, Canada Filed June 28, 1965, Ser. No. 468,194
6 Claims. (Cl. 307—88.5)

ABSTRACT OF THE DISCLOSURE

A triggered marker generator generates a marker pulse from a signal indicating the response of a crystal to sweep frequency excitation by frequencies including the natural frequency of the crystal, the signal being in the form of pulses of opposite-going polarities of decaying amplitude. A first transistor is biased to non-conduction and the signal is applied to it to render the transistor conductive on the first of the pulses. This transistor is held cut-off during subsequent pulses of the signal by a second transistor also biased to non-conduction and of opposite conductivity type to the first transistor, a capacitor connected to the output circuit of the second transistor and in series with rectifying means and adapted to be charged during conduction of the second transistor, such conduction occurring during the first pulse of the signal, and a circuit that is connected to the first transistor providing a discharge path for the capacitor.

This invention relates to a triggered marker generator which may be used, for example, to provide audio markers for the alignment of radio receivers and the intermediate frequency sections of television receivers, and video markers for the alignment of the video sections of television receivers.

It is known that a crystal, usually of quartz, when ground to certain dimensions, can function as a tuned circuit. Such a crystal will oscillate briefly if it is excited by the external application of a frequency that is equal to the natural frequency of the crystal. This property has been used in the past in order to generate marker signals, but prior art marker generators of which I am aware that rely on crystal response to sweep frequency excitation are relatively complex and expensive circuits requiring an amplifier and two multivibrators (five transistors) to produce a narrow marker pulse.

In accordance with this invention there is provided a triggered marker generator which is embodied in a relatively simple circuit and which can generate narrow marker pulses using fewer than five transistors.

In brief, in accordance with this invention there is provided a triggered marker generator for generating a marker pulse from a signal indicating the response of a crystal to the sweep frequency excitation of the crystal by a band of frequencies that include the natural frequency of the crystal. This signal is in the form of a series of interconnected pulses alternately of opposite-going polarities. Such a triggered marker generator comprises a transistor that is biased to non-conduction, means for applying the aforementioned signal to the transistor with the polarity required to render the transistor conductive on the first one of the series of interconnected pulses, and means responsive to conduction of the transistor for developing and applying a signal to the transistor to cut-off the transistor during application of pulses subsequent to the first pulse of the signal. As a result of this action, the transistor produces a single pulse for each one of the signals, the single pulses being triggered on the leading edges of the first pulses of the signals.

Figures 1, 2:
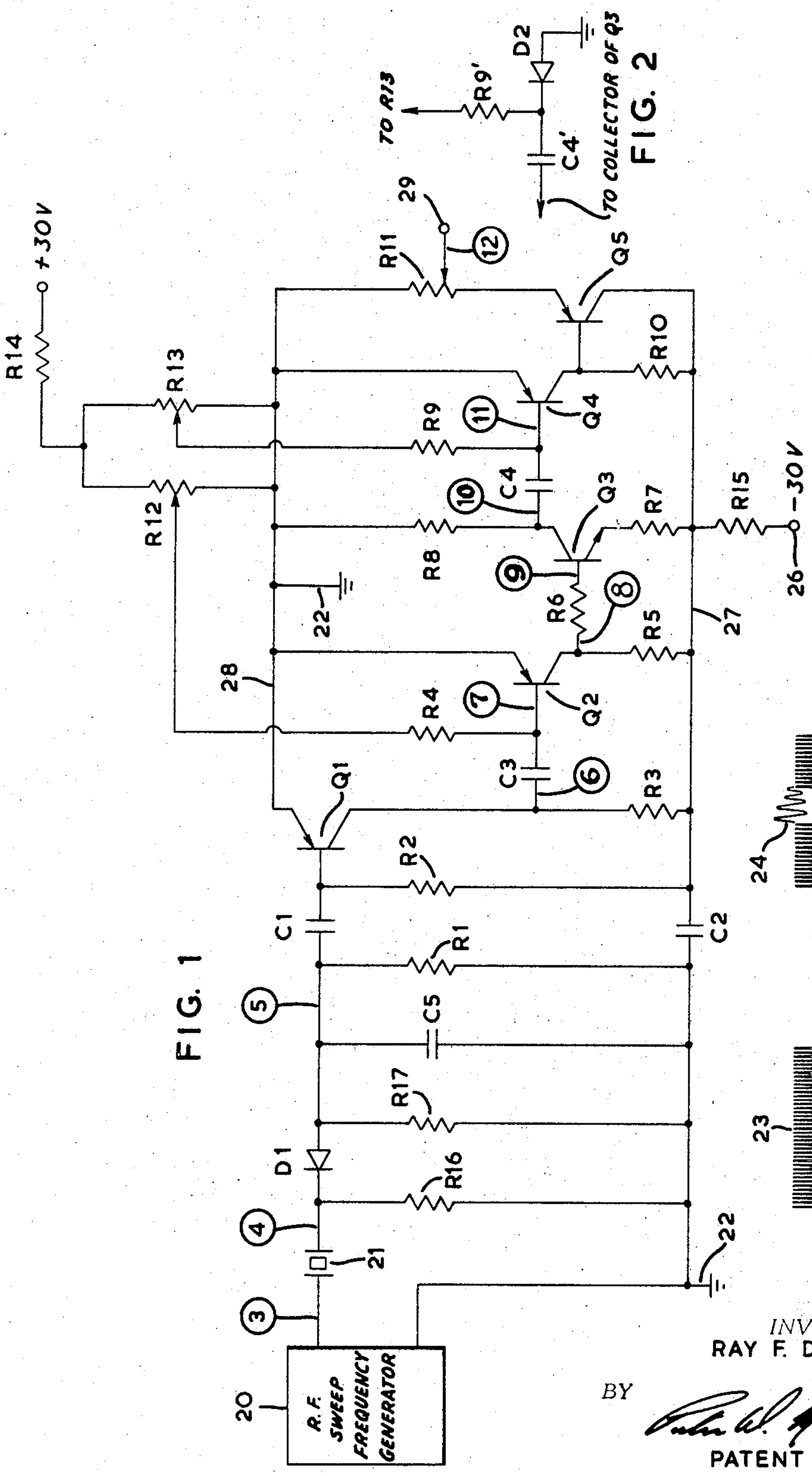

This invention will become more apparent from the following detailed description taken in conjunction with the appended drawings, in which:

FIGURE 1 is a circuit diagram showing one embodiment of a marker generator constructed in accordance with this invention, FIGURE 2 shows an alternate circuit that may be substituted for a part of the circuit shown in FIGURE 1, and FIGURES 3–12 inclusive show the waveforms appearing at points 3–12 respectively noted in FIGURE 1.

Referring to FIGURE 1, one output terminal of an RF sweep frequency generator 20 is connected to the input terminal of a suitable crystal 21 such as a quartz crystal, for example, while the other output terminal of generator 20 is grounded, as at 22. The output terminal of crystal 21 is connected via a load resistor R16 to ground and also to the cathode of a diode D1 which may be of a semiconductor type. The anode of diode D1 is connected through the parallel combination of a resistor R17 and a capacitor C5 to ground. Resistor R17 and capacitor C5 constitute a filter, while the whole of the circuit consisting of resistors R16 and R17, capacitor C5 and diode D1 constitutes a detector.

Figure 3:
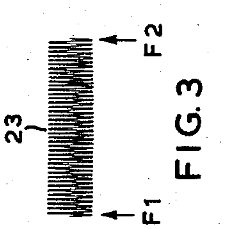

The sweep frequency signal generated by RF sweep frequency generator 20 as it appears between point 3 (FIGURE 1) and ground is shown at 23 in FIGURE 3. The RF sweep frequency varies from a frequency of F1 to F2 which includes the natural frequency FC (FIGURE 4) of crystal 21.

When RF signal 23 is applied to crystal 21, the crystal oscillates briefly when the frequency of the RF signal is equal to the natural frequency FC of crystal 21. A modulation of RF signal 23 occurs, this modulation consisting of a decaying signal 24 (FIGURE 4) which is a beat derived from the shocked oscillation of crystal 21 and RF sweep signal 23.

The magnitude of signal 24, which thus indicates the response of crystal 21 to the sweep frequency excitation of the crystal by RF signal 23, is dependent on the rate at which the sweep frequency passes through the natural frequency of the crystal, as well as on the characteristics of crystal 21. This rate is determined by the sweep frequency and the sweep width. A wide sweep width would have to be swept more slowly than a narrow sweep width to achieve the same amplitude of response from crystal 21. Satisfactory results can be obtained using a sweep generator 20 that produces a signal varying from low to high frequencies at a rate of 60 cycles per second and including the frequency FC.

Figure 4:
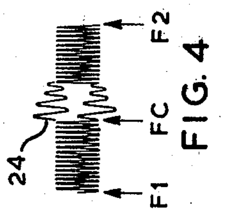

The signal developed across resistor R16 in FIGURE 1 is as shown in FIGURE 4.

The leading edge of signal 24 marks the exact spot where the natural frequency of crystal 21 and the frequency of sweep signal 23 are the same. The detector eliminates RF signal 23 so that the signal appearing at point 5 in FIGURE 1 is as shown at 25 in FIGURE 5, signal 25 being of the order of millivolts in strength. Signals 24 and 25 are shown on a considerably larger scale than the waveforms of FIGURES 6–12. Signal 25 is developed across a resistor R1 which is connected to the anode of diode D1 and also to ground 22. Signal 25 is capacitively coupled via a capacitor C1 to the base electrode of a PNP transistor Q1 connected in grounded emitter configuration. The base electrode of transistor Q1 is connected via a resistor R2 to one side of a filter capacitor C2, the other side of which is connected to ground 22. Resistor R2 provides a path for transistor Q1 to be biased into conduction from a source of negative DC potential B— (not shown) connected to a terminal 26 and applied to the base of transistor Q1 via a resistor R15, a conductor 27 and resistor R2. Capacitor C2 filters out the ripple voltage developed across resistor R15 when transistors Q2, Q3, Q4 and Q5 conduct.

The output circuit of transistor Q1, which acts as an amplifier, consists of a resistor R3 connected between the collector of transistor Q1 and conductor 27. The output signal from transistor Q1 is capacitively coupled via a capacitor C3 to the base electrode of a PNP transistor Q2 which, together with a transistor Q3, constitutes a trigger circuit. Since the input and output coupling to and from transistor Q1 is capacitive, D.C. operating conditions are not critical. The emitter electrodes of transistors Q1 and Q2 both are connected to ground 22 via a conductor 28. The output circuit of transistor Q2 consists of a resistor R5 connected between the collector electrode of transistor Q2 and conductor 27. The collector electrode of transistor Q2 is direct coupled by a resistor R6 to the base electrode of an NPN transistor Q3, the emitter electrode of which is connected via a resistor R7 to conductor 27.

Transistor Q2 is biased to non-conduction by a resistor R4 which is connected through a potentiometer R12 and a resistor R14 to a suitable source of positive D.C. potential B+ (not shown). Transistor Q3 also is biased to non-conduction through the path consisting of resistors R6 and R5, conductor 27 and resistor R15 to B−.

The collector electrode of transistor Q3 is connected via a load resistor R8 and conductor 28 to ground 22.

Connected between the base electrode of a PNP transistor Q4 and the common terminal of resistor R8 and the collector electrode of transistor Q3 is a capacitor C4.

Figures 5, 6, 7, 8, 9, 10, 11, 12:
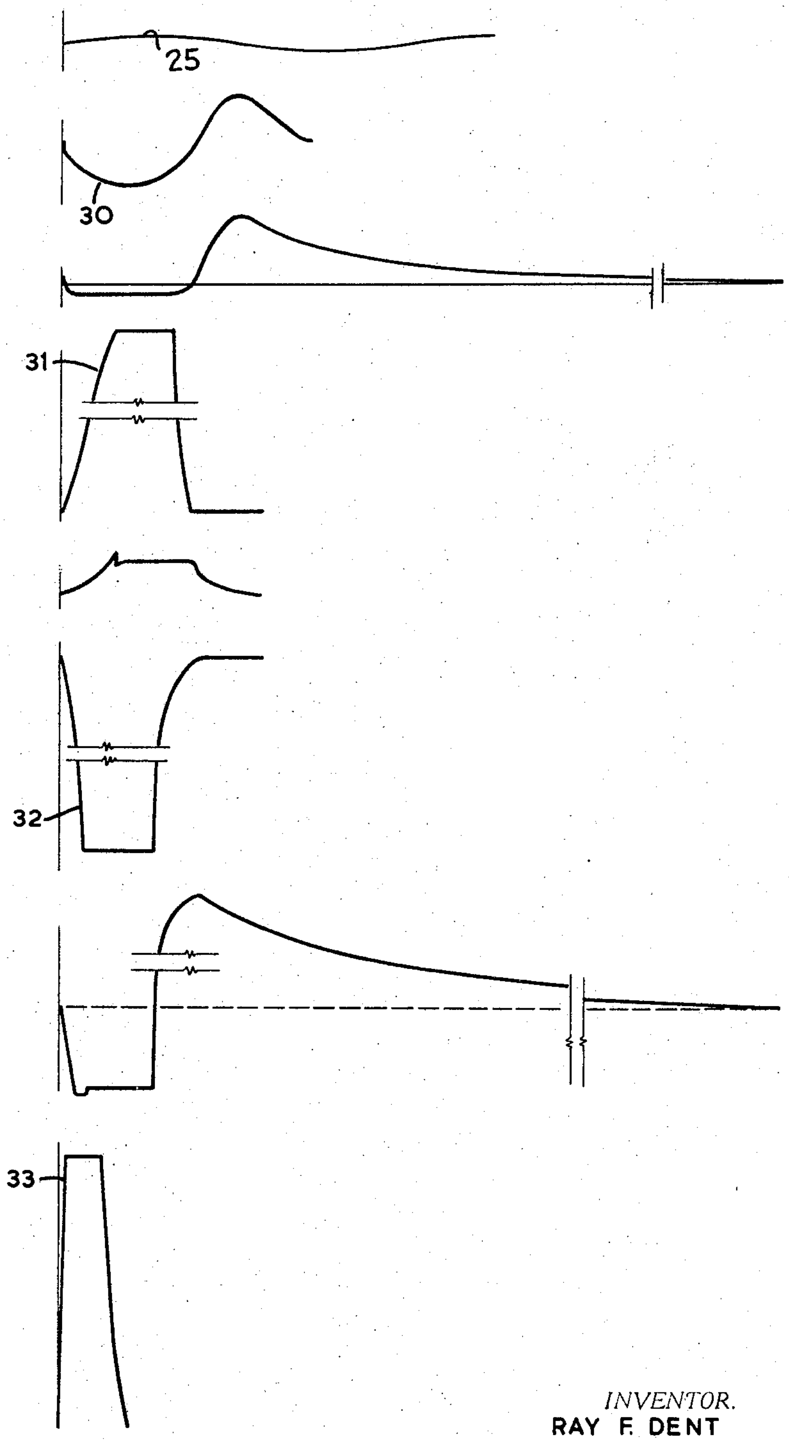

Transistor Q4 is connected in ground emitter configuration, the emitter electrode of transistor Q4 being connected to ground 22 via conductor 28, while the collector electrode of transistor Q4 is connected to conductor 27 via a load resistor R10. The signal developed across resistor R10 is applied directly to the base of a transistor Q5 and is developed across a potentiometer R11 connected between the emitter electrode of transistor Q5 and ground 22 via conductor 28. The output signal shown in FIGURE 12 is developed across potentiometer R11 and appears between terminal 29 and ground. The collector electrode of transistor Q5 is connected to conductor 27.

Resistor R14 is connected through parallel connected potentiometers R12 and R13 to ground 22 via conductor 28. The slider of potentiometer R13 is connected via a resistor R9 to the common terminals of the base electrode of transistor Q4 and capacitor C4 to provide a path for the discharge of capacitor C4.

In place of transistor Q4 a diode D2 may be used. Thus, in place of capacitor C4, resistor R9, transistor Q4, resistor R10, transistor Q5 and resistor R11 the circuit shown in FIGURE 2 may be employed, capacitor C4′ being substituted for capacitor C4, resistor R9′ being substituted for resistor R9, and diode D2 being substituted for transistor Q4. In this event the marker pulse may be obtained at any one of points 8, 9 or 10 for example, although the marker pulses at these points are not as narrow as the marker pulse obtained at terminal 29, as may be seen by comparing FIGURES 8, 9 and 10 with FIGURE 12.

The operation of the circuit shown in FIGURE 1 now will be described.

Signal 25 (FIGURE 5) is applied to the base electrode of transistor Q1 via coupling capacitor C1. As aforementioned, transistor Q1 is biased to conduction from B− via resistor R15, conductor 27 and resistor R2. The positive-going first pulse of signal 25 is amplified by transistor Q1 without any clipping of its peak value. The signal 30 developed in the output circuit of transistor Q1 across collector resistor R3 is shown in FIGURE 6.

Transistor Q2 is biased to non-conduction from B+ via resistor R14, potentiometer R12 and resistor R4. Transistor Q3 also is biased to non-conduction from B− via resistor R15, conductor 27 and resistors R5 and R6.

Signal 30 is applied to the base electrode of transistor Q2 via coupling capacitor C3, and the negative-going pulse of signal 30 drives transistor Q2 into conduction. The signal 31 developed in the output circuit of transistor Q2 across collector resistor R5 is shown in FIGURE 8.

Signal 31 is direct coupled via resistor R6 to the base electrode of transistor Q3, and the application of this signal to transistor Q3 drives it into conduction. The signal 32 developed in the output circuit of transistor Q3 across collector resistor R8 is shown in FIGURE 10.

At this point the positive feedback to the base of transistor Q1 should be noted. This positive feedback is due to a positive-going bias on the base of transistor Q1. As transistors Q2 and Q3 conduct, the current passing through B− dropping resistor R15 increases. This makes the bias voltage impressed on the base of transistor Q1 via conductor 27 and resistor R2 more positive, thus increasing the conduction of transistor Q1 and driving transistors Q2 and Q3 on harder, until transistor Q2 is driven to saturation. By this time the initial pulse of signal 25 will have passed.

Returning now to a consideration of signal 32 a feedback to transistor Q2 will be considered. As the collector of transistor Q3 goes negative (FIGURE 10) capacitor C4 is charged. This occurs because the diode action of the base-emitter junction of transistor Q4 holds one plate of capacitor C4 near ground potential. After the negative-going pulse of signal 30 has been applied to the base of transistor Q2, this transistor and transistor Q3 start to return to non-conduction. Thus, the collector of transistor Q3 begins to return to ground potential, and capacitor C4, no longer clamped to ground potential through the base-emitter junction of transistor Q4, imparts a positive pulse to resistor R9 and potentiometer R13. This causes less current to be drawn through resistor R14. Thus, the voltage at the slider of R12 becomes more positive, and this positive pulse is applied to the base of transistor Q2 driving it and transistor Q3 quickly into non-conduction. Capacitor C4 discharges to ground through resistor R9 and potentiometer R13 at a slow enough rate to cause the positive feedback to the base of transistor Q2 to be effective for the full duration of signal 25 subsequent to the first pulse thereof. The subsequent pulses cannot trigger transistor Q2 because their negative amplitude, when applied to the base of transistor Q2, cannot overcome the positive feedback.

It can be seen from the foregoing that there is provided a circuit which is responsive to conduction of transistor Q2 for developing and applying a feedback signal to transistor Q2 to cut-off this transistor during application of pulses in a single signal 25 to the transistor subsequent to the first pulse of that one signal or pulse train 25.

It will be appreciated, of course, that negative pulse 32 shown in FIGURE 10 eventually becomes sufficiently negative to cause transistor Q4, which is biased to non-conduction from B+ via resistor R14, potentiometer R13 and resistor R9, to conduct. The signal developed across resistor R10 is applied to the base electrode of transistor Q5. The signal 33 developed across potentiometer R11 and appearing at terminal 29 is shown in FIGURE 12. As will be seen from FIGURE 12, signal 33 is a narrow pulse, and the horizontal displacement of its leading edge on a scope trace exactly corresponds to the natural frequency of crystal 21.

If desired, instead of deriving marker pulse 33 from terminal 29, it may be obtained at points 8, 9 or 10 in FIGURE 1, since the horizontal displacement of leading edges of the signals shown in FIGURES 8, 9 and 10 on a scope trace all correspond to the natural frequency of crystal 21.

Transistor Q4 acts as an amplifier, while transistor Q5, connected as an amplifier in emitter follower configuration, provides a low impedance output. Other types of output circuits could be employed, however, without departing from this invention.

As an example of this invention a circuit of the type shown in FIGURE 1 can be constructed using the following components:

| | |
|---|---|
| R1 | 10K. |
| C1 | 2200 μf. |
| C2 | 18 μf. |
| R2 | 470K. |
| R3 | 2.2K. |
| C3 | .01 μf. |
| R4 | 100K. |
| R5 | 2.2K. |
| R6 | 180K. |
| R7 | 56Ω. |
| R8 | 2.2K. |
| C4 | 2200 μf. |
| R9 | 82K. |
| R10 | 2.2K. |
| R11 | 3K. |
| R12 | 5K. |
| R13 | 5K. |
| R14 | 5K. |
| Q1, Q2, Q4 and Q5 | Philips OC75. |
| Q3 | G.E. 4JX16A567 or 2N2712. |

With such a circuit it has been found that the horizontal displacement of marker pulse 33 on the scope trace marks the natural frequency FC of crystal 21 with an error of about 5 kc. in 50 mc. Crystal errors can add another error of about 15 kc., so that the total error is of the order of about 20 kc. in 50 mc. which is quite satisfactory taking into consideration limits in the oscilloscope trace and the viewer's subjective judgment.

The marked interval is limited by the proximity of crystal frequencies and by the induced hold-off in the trigger circuit. The hold-off can be adjusted by varying the value of capacitor C4, but the time for signal 25 to decay cannot be varied so easily. In the 50 mc. range marker frequencies probably should be no closer than 200 kc.

It will be appreciated, of course, that if diode D1 is reversed so that its anode is connected to crystal 21 and its cathode to resistor R17 and capacitor C5, the initial pulse of signal 25 will be negative-going, rather than positive-going. It also will be appreciated that with appropriate changes in bias PNP transistors in FIGURE 1 may be changed to NPN transistors and vice versa.

While a preferred embodiment of this invention has been disclosed herein, those skilled in the art will appreciate that changes and modifications may be made therein without departing from the spirit and scope of this invention as defined in the appended claims.

The embodiments of the invention in which an exclusive property or privilege is claimed are defined as follows:

1. A triggered marker generator for generating a marker pulse from a signal indicating the response of a crystal to the sweep frequency excitation of said crystal by a band of frequencies including the natural frequency of said crystal, said signal being in the form of a series of interconnected pulses alternately of opposite-going polarities, which comprises: a first transistor of one conductivity type for amplifying said signal and having an output circuit; a second transistor of said one conductivity type and biased to non-conduction, said second transistor having an input circuit, said output circuit being connected to said input circuit to apply the amplified signal from said first transistor to said second transistor with the polarity required to render said second transistor conductive on the first one of said interconnected pulses; means for biasing said first transistor into conduction and including a resistor connected to said first and second transistors and through which current is drawn when said second transistor conducts, the voltage developed across said resistor due to passage of said current therethrough being in a direction to increase the bias on and conduction of said first transistor; and means responsive to conduction of said second transistor for developing and applying a signal to said second transistor to cut-off said second transistor during application of pulses subsequent to said first pulse of said signal, whereby said second transistor produces a single pulse for each one of said signals, said single pulses being triggered on the leading edges of said first pulses of said signals.

2. A triggered marker generator according to claim 1 including means for generating said signal, said last-mentioned means including a crystal, an RF sweep frequency generator connected to said crystal for sweeping said crystal with said band of frequencies to produce an RF signal modulated with said signal, and a detector connected to said crystal for detecting said signal; and means connecting said detector to apply said signal to said first transistor.

3. A triggered marker generator for generating a marker pulse from a signal indicating the response of a crystal to the sweep frequency excitation of said crystal by a band of frequencies including the natural frequency of said crystal, said signal being in the form of a series of interconnected pulse alternately of opposite-going polarities, which comprises: a first transistor biased to non-conduction and having an output circuit; means for applying said signal to said first transistor with the polarity required to render said first transistor conductive on the first one of said interconnected pulses and develop an output signal in said output circuit; and means responsive to conduction of said first transistor for developing and applying a signal to said first transistor to cut-off said first transistor during application of pulses subsequent to said first pulse of said signal, whereby said first transistor produces a signal pulse for each one of said signals, said single pulses being triggered on the leading edges of said first pulses of said signals, said last-mentioned means including a second transistor of opposite conductivity type to the conductivity type of said first transistor and biased to non-conduction, said second transistor having an input circuit and an output circuit, means connecting said input circuit to said output circuit of said first transistor for applying said output signal to said input circuit with the polarity required to render said second transistor conductive to develop another output signal of opposite-going polarity to the first-mentioned output signal in said output circuit of said second transistor, a capacitor connected to said output circuit of said second transistor and in series with rectifying means and adapted to be charged during conduction of said second transistor, and a circuit having a connection to said first transistor and through which said capacitor is adapted to discharge.

4. A triggered marker generator for generating a marker pulse from a signal indicating the response of a crystal to the sweep frequency excitation of said crystal by a band of frequencies including the natural frequency of said crystal, said signal being in the form of a series of interconnected pulses alternately of opposite-going polarities, which comprises: a first transistor of one conductivity type for amplifying said signal and having an output circuit; a second transistor of said one conductivity type and biased to non-conduction, said second transistor having an input circuit and an output circuit, said output circuit of said first transistor being connected to said input circuit to apply the amplified signal from said first transistor to said second transistor with the polarity required to render said second transistor conductive on the first one of said interconnected pulses and develop an output signal in said output circuit of said second transistor; means for biasing said first transistor into conduction and including a resistor connected to said first and second transistors and through which current is drawn when said second transistor conducts, the voltage developed across said resistor due to passage of said current therethrough being in a direction to increase the bias on and conduction of said first transistor; and means responsive to conduction of said second transistor for developing and supplying a signal to said second transistor to cut-off said second transistor during application of pulses subsequent to said first pulse of said signal, whereby said second transistor produces a single pulse for each one of said signals, said single pulses being triggered on the leading edges of said first pulses of said signals, said last-mentioned means including a third transistor of opposite conductivity type to said one conductivity type and biased to non-conduction, said third transistor having an input circuit and an output circuit, means connecting said input circuit of said third transistor to said output circuit of said second transistor for applying said output signal to said input circuit of said third transistor with the polarity required to render said third transistor conductive to develop another output signal of opposite-going polarity to the first-mentioned output signal in said output circuit of said third transistor, a capacitor connected to said output circuit of said third transistor and in series with a rectifying means and adapted to be charged during conduction of said third transistor, and a circuit having a connection to said second transistor and through which said capacitor is adapted to discharge.

5. A triggered marker generator according to claim 4 including means connected to said last-mentioned circuit for biasing said second transistor to non-conduction.

6. A triggered marker generator according to claim 5 including means for generating said signal, said last-mentioned means including a crystal, an RF sweep frequency generator connected to said crystal for sweeping said crystal with said band of frequencies to produce an RF signal modulated with said signal, and a detector connected to said crystal for detecting said signal; and means connecting said detector to apply said signal to said first transistor.

References Cited

UNITED STATES PATENTS

| | | | |
|---|---|---|---|
| 2,562,295 | 7/1951 | Chance | 328—185 |
| 3,124,706 | 3/1964 | Alexander | 307—88.5 |
| 3,217,248 | 11/1965 | Itzkan | 324—81 XR |

OTHER REFERENCES

"Z-Axis Marker Generator for Bandpass Circuit Alignment" by Odorizzi in Electronics, June 24, 1960, pp. 108–110.

ARTHUR GAUSS, *Primary Examiner.*

S. MILLER, *Assistant Examiner.*